US009341287B2

(12) United States Patent
Eller et al.

(10) Patent No.: US 9,341,287 B2
(45) Date of Patent: May 17, 2016

(54) FRICTION STIR WELDED PIPES

(71) Applicant: LOCKHEED MARTIN CORPORATION, Bethesda, MD (US)

(72) Inventors: Michael R. Eller, New Orleans, LA (US); Randy J. Brown, Slidell, LA (US); Duy N. Pham, Marrero, LA (US); Eugene C. Jansen, Stafford, VA (US); Trevor Owen, Vienna, VA (US); Kevin Miller, Manassas Park, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 164 days.

(21) Appl. No.: 14/187,777

(22) Filed: Feb. 24, 2014

(65) Prior Publication Data
US 2015/0240970 A1    Aug. 27, 2015

(51) Int. Cl.
*F16L 9/18* (2006.01)
*F16L 9/04* (2006.01)
*B23K 20/12* (2006.01)
*B21C 37/08* (2006.01)
*B21C 37/15* (2006.01)
(Continued)

(52) U.S. Cl.
CPC . *F16L 9/04* (2013.01); *B21C 37/08* (2013.01); *B21C 37/154* (2013.01); *B23K 20/122* (2013.01); *B23K 20/129* (2013.01); *F03G 7/05* (2013.01); *F16L 9/02* (2013.01); *F16L 9/22* (2013.01); *F16L 11/18* (2013.01); *F16L 59/06* (2013.01); *F16L 59/143* (2013.01); *B23K 2201/06* (2013.01)

(58) Field of Classification Search
CPC ........ F16L 9/04; B23K 20/122; B23K 20/129
USPC .......... 138/112–114, 109, 148, 149, 156, 157
See application file for complete search history.

(56) References Cited

U.S. PATENT DOCUMENTS 5,690,148 A * 11/1997 Ziu .................... F16L 47/03
138/113
6,058,979 A * 5/2000 Watkins .................. B29C 70/66
138/114

(Continued)

FOREIGN PATENT DOCUMENTS

FR    2922623 A1    4/2009
FR    2937706 A1    4/2010
(Continued)

OTHER PUBLICATIONS

U.S. Appl. No. 14/199,513, filed Mar. 6, 2014 (22 pages).
(Continued)

*Primary Examiner* — Patrick F Brinson
(74) *Attorney, Agent, or Firm* — Withrow & Terranova, P.L.L.C.

(57) ABSTRACT

Fluid conveying pipes and processes of forming such pipes using friction stir welding. The fluid conveying pipes are formed from a pipe section that includes a first barrel coaxially and concentrically disposed within a second barrel. The first barrel and the second barrel are each formed from one or more sections or plates where longitudinal extending facing edges of the plates are friction stir welded (FSW) together along a seam(s) that extends longitudinally from the first end to the second end thereof. A plurality of the pipe sections can be connected together end to end using circumferential FSW seams to form a pipe.

30 Claims, 12 Drawing Sheets

(51) Int. Cl.
   *F03G 7/05*   (2006.01)
   *F16L 59/06*  (2006.01)
   *F16L 59/14*  (2006.01)
   *F16L 9/02*   (2006.01)
   *F16L 9/22*   (2006.01)
   *F16L 11/18*  (2006.01)

(56) References Cited

U.S. PATENT DOCUMENTS

| | | | |
|---|---|---|---|
| 6,513,551 B2 * | 2/2003 | Louis | F16L 1/123 138/108 |
| 6,921,564 B1 * | 7/2005 | Keenan | F16L 59/024 137/375 |
| 8,152,949 B2 | 4/2012 | Bailey et al. | |
| 8,291,940 B2 * | 10/2012 | Frohne | F16L 7/00 138/112 |
| 8,439,250 B2 | 5/2013 | Takeshita et al. | |
| 2003/0047227 A1 * | 3/2003 | Louis | F16L 1/123 138/112 |
| 2003/0075226 A1 * | 4/2003 | Codling | F16L 59/065 138/113 |
| 2004/0026922 A1 | 2/2004 | Carns et al. | |
| 2006/0169344 A1 * | 8/2006 | Toole | F16L 59/021 138/149 |
| 2008/0029578 A1 | 2/2008 | Steel et al. | |
| 2009/0314376 A1 * | 12/2009 | Wagner | E04F 17/02 138/148 |
| 2012/0160363 A1 * | 6/2012 | Jin | C22C 38/04 138/177 |
| 2013/0037601 A1 | 2/2013 | Eller et al. | |
| 2013/0092279 A1 * | 4/2013 | Daniel | B21C 37/065 138/157 |

FOREIGN PATENT DOCUMENTS

| | | |
|---|---|---|
| JP | H1147858 A | 2/1999 |
| JP | H1162101 A | 3/1999 |
| WO | 2013007481 A1 | 1/2013 |

OTHER PUBLICATIONS

W.H. Avery and C. Wu, "Renewable Energy from the Ocean: A Guide to OTEC," Oxford University Press, 1994, p. 156-159.

"Deep Pipelines for Ocean Thermal Energy Conversion," Makai Ocean Engineering, found online at www.makai.com/piplines/otec, available at least as of Aug. 6, 2013 (4 pages).

"OTEC—Ocean Thermal Energy Conversion," Makai Ocean Engineering, found online at www.makai.com/otec-ocean-thermal-energy-conversion/, available at least as of Nov. 26, 2013 (7 pages).

Description prepared by applicant of a deployment of a High Density Polyethylene cold water pipe in 1979 and in the early 1980's (1 page).

Materials prepared by applicant, including text and photographs, regarding a demonstration of a fiber-wrapped plastic cold water pipe with syntactic foam in 1983 (2 pages).

Materials prepared by applicant, including text and photographs, regarding an offshore-based, in situ vacuum assisted resin transfer molding fabrication of a composite cold water pipe in existence prior to the filing date (1 page).

Materials prepared by applicant, including text and photographs, regarding a pre-fabricated high density polyethylene cold water pipe in existence prior to the filing date (1 page).

Materials prepared by applicant, including text and drawings, regarding an in situ joining of pre-fabricated fiber reinforced plastic cold water pipe in existence prior to the filing date (1 page).

Text and photograph regarding a land-based OTEC deployment of flanged steel cold water pipe in 1930 (1 page).

Photographs of friction stir welding tools obtained from www.megastir.com on or around Nov. 21, 2013.

International Search Report and Written Opinion for PCT/US2015/016112, mailed Apr. 29, 2015, 10 pages.

* cited by examiner

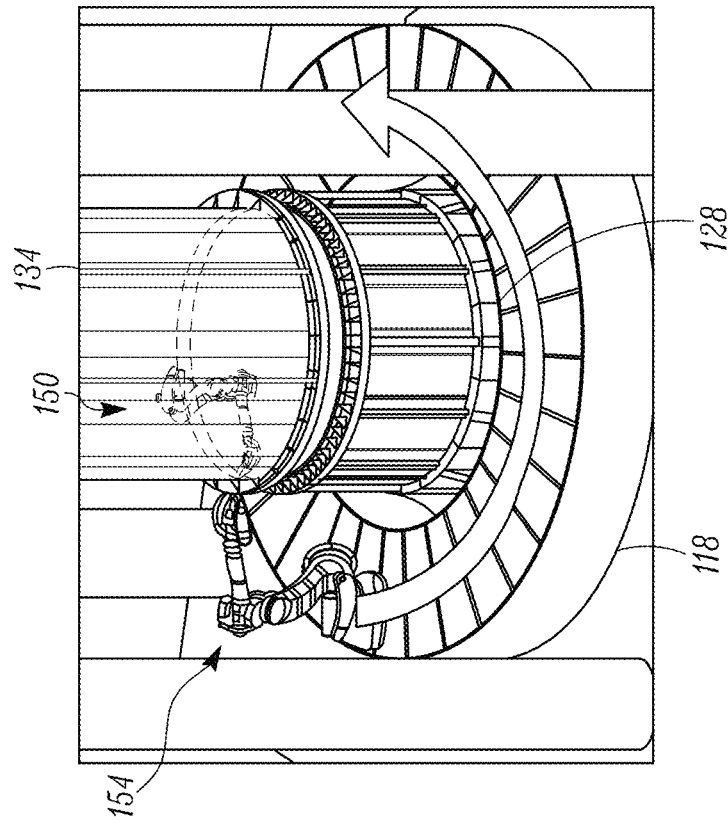
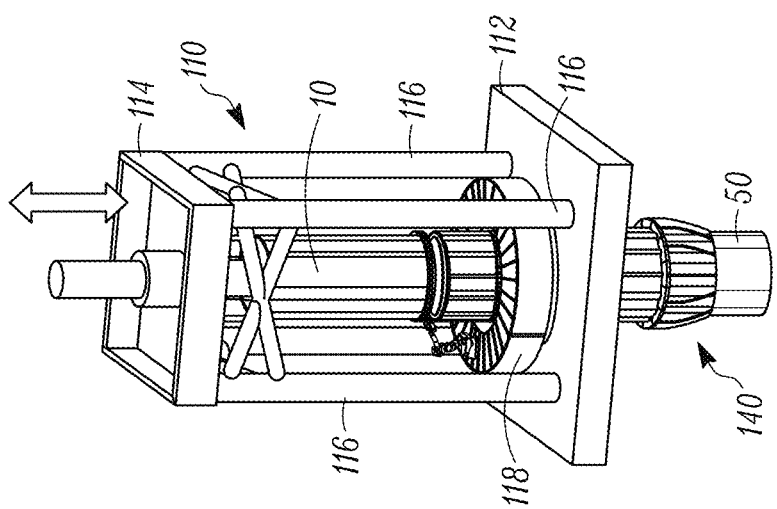
FIG. 9
FIG. 8

FRICTION STIR WELDED PIPES

FIELD

This disclosure relates to the production of fluid conveying pipes using friction stir welding.

BACKGROUND

Most metals, even marine-grade metals, show evidence of corrosion after use in water environments, including salt, brackish, and fresh water environments. Corrosion is especially pronounced in cold, deep salt water. Over time, the corrosion can be detrimental to long-term operational sustainment of the metal object that is exposed to the water environment.

The use of friction stir welding (FSW) to join two metallic objects at a weld joint is known. When those objects are exposed to a water environment, it has been observed that at the location of the FSW joint, there is little or no corrosion that occurs, while significant corrosion occurs on the metal objects at locations outside of the FSW joint in the base metal alloy.

The use of the FSW process to connect the ends of tubes to a tube sheet in heat exchanger applications are disclosed in U.S. Pat. No. 8,439,250 and in U.S. Published Patent Application No. 2013/0037601. In addition, the formation of a tube using the FSW process is disclosed in U.S. Provisional Application No. 61/777,419, filed on Mar. 12, 2013 and titled Friction Surface Stir Process.

SUMMARY

This disclosure describes fluid conveying pipes and processes of forming such pipes using the FSW process. The fluid conveying pipes are formed from at least one pipe section that is constructed from one or more pipe segments with facing edges that are friction stir welded together along a seam(s) that extends longitudinally from a first end to a second end thereof. The resulting pipe section includes a first barrel coaxially and concentrically disposed within a second barrel and spaced from one another by one or more spacers.

In the case of certain pipes, for example very large diameter pipes up to or even greater than about 10 meters in diameter, each pipe section can be formed from a plurality of pipe segments, where the pipe segments are joined together along longitudinally extending facing edges thereof using the FSW process. In addition, a number of the pipe sections can be connected together end to end using circumferential FSW seams to form long, large diameter pipes.

New systems, tools and methods are also described herein for constructing a pipe from the pipe sections using the FSW process.

A fluid conveying pipe described herein can be utilized in any desired application for conveying a fluid. In one non-limiting example, the fluid conveying pipe can be used as a cold water intake pipe in an ocean thermal energy conversion (OTEC) plant.

In one embodiment, a fluid conveying pipe has a pipe section that includes a first barrel coaxially and concentrically disposed within a second barrel, where the first barrel and the second barrel each include an interior surface, an exterior surface, a first end and a second end. The interior surface of the first barrel forms a fluid passageway that extends along a longitudinal axis, and the exterior surface of the first barrel is spaced from the interior surface of the second barrel to form a gap therebetween. A spacer is disposed within the gap to space the first barrel from the second barrel. In addition, each of the first barrel and the second barrel includes a friction stir welded seam that extends from the first end to the second end thereof.

In another embodiment, a method of forming a fluid conveying pipe includes forming a pipe section by friction stir welding adjacent longitudinal edges on longitudinally facing edges of at least one pipe segment. The pipe segment(s) form first and second barrels each of which includes a friction stir welded seam that extends longitudinally from a first end to a second end of each of the barrels. The first barrel and the second barrel each include an interior surface and an exterior surface. The first barrel is arranged coaxially and concentrically within the second barrel and a spacer spaces the first barrel from the second barrel. The interior surface of the first barrel forms a fluid passageway that extends along a longitudinal axis, and the exterior surface of the first barrel is spaced from the interior surface of the second barrel by the spacer to form a gap therebetween.

The first barrel and the second barrel can be formed of a material such as metal including, but not limited to, aluminum, aluminum bronze, titanium, steel, copper and alloys thereof, or plastic.

In an embodiment, the buoyancy of certain ones of the pipe sections can be adjusted to tailor the buoyancy characteristics of the pipe. For example, in addition to a spacer to maintain the gap between the first barrel and the second barrel, some or the entire gap can be filled with air, and/or other gases, and/or fluids such as water or other near-incompressible/incompressible fluids, to control the buoyancy of the pipe section. If foam is disposed in the gap, the foam may also be used to adjust the buoyancy of the pipe section.

A plurality of the pipe sections can be joined together using the FSW process to produce a complete pipe. In one embodiment, a connecting ring can be used to connect the pipe sections to one another, with the connecting ring being secured to the ends of adjacent pipe sections using circumferential FSW seams. The connecting ring can be flexible to allow the pipe sections to flex relative to one another, or the connecting ring can be designed to be relatively stiff or non-flexible.

In another embodiment, the pipe is formed from a plurality of extruded pipe segments, where each extruded segment includes an inner plate that contributes to forming the inner or first barrel, an outer plate that contributes to forming the outer or second barrel, and one or more spacers. The inner plate, outer plate, and spacer(s) form an integral extrusion, for example of aluminum or other suitable material, creating a single, one-piece construction. In an embodiment, the extruded pipe segments are joined together along longitudinal seams by FSW using a self-reacting FSW tool.

The resulting pipe can have a diameter and a length that is suitable for the intended application of the pipe. For example, for a cold water intake pipe in an OTEC plant, the pipe can have a diameter of up to 10 meters or even larger, for example a diameter between about 1 meter and about 10 meters. In addition, the cold water pipe can have a length of up to about 1000 meters or even larger. However, other diameters and lengths can be used.

The pipe sections can be joined together in the FSW process while in a vertical orientation where the longitudinal axis of the pipe sections extend generally vertically, the pipe sections can be joined together in the FSW process while in a horizontal orientation where the longitudinal axis of the pipe sections extend generally horizontally, or the pipe sections can be joined together in the FSW process while oriented at any angle between vertical and horizontal. An external FSW tool can be used to form external circumferential FSW seams between the pipe sections and the connecting rings, while an internal FSW tool disposed within the pipe section can be used to form internal circumferential FSW seams between the pipe sections and the connecting rings. The internal FSW tool can also be used to react loads from the external FSW tool while the external FSW tool is performing welding.

In the case where the pipe sections are joined together while in a vertical orientation, a rigging structure can be used to support the pipe sections, as well as mounting the internal and external FSW tools to permit the FSW tools to move circumferentially relative to the pipe sections to produce the circumferential welds.

DRAWINGS

FIG. 8 illustrates an example of a rigging structure that can be used to FSW two vertically oriented pipe sections to one another.

FIG. 9 illustrates the external and internal FSW tools that perform the circumferential welding.

FIGS. 14A-D illustrates an exemplary embodiment of removing the FSW pin tool from the material at the end of the FSW weld path.

Figure 15:
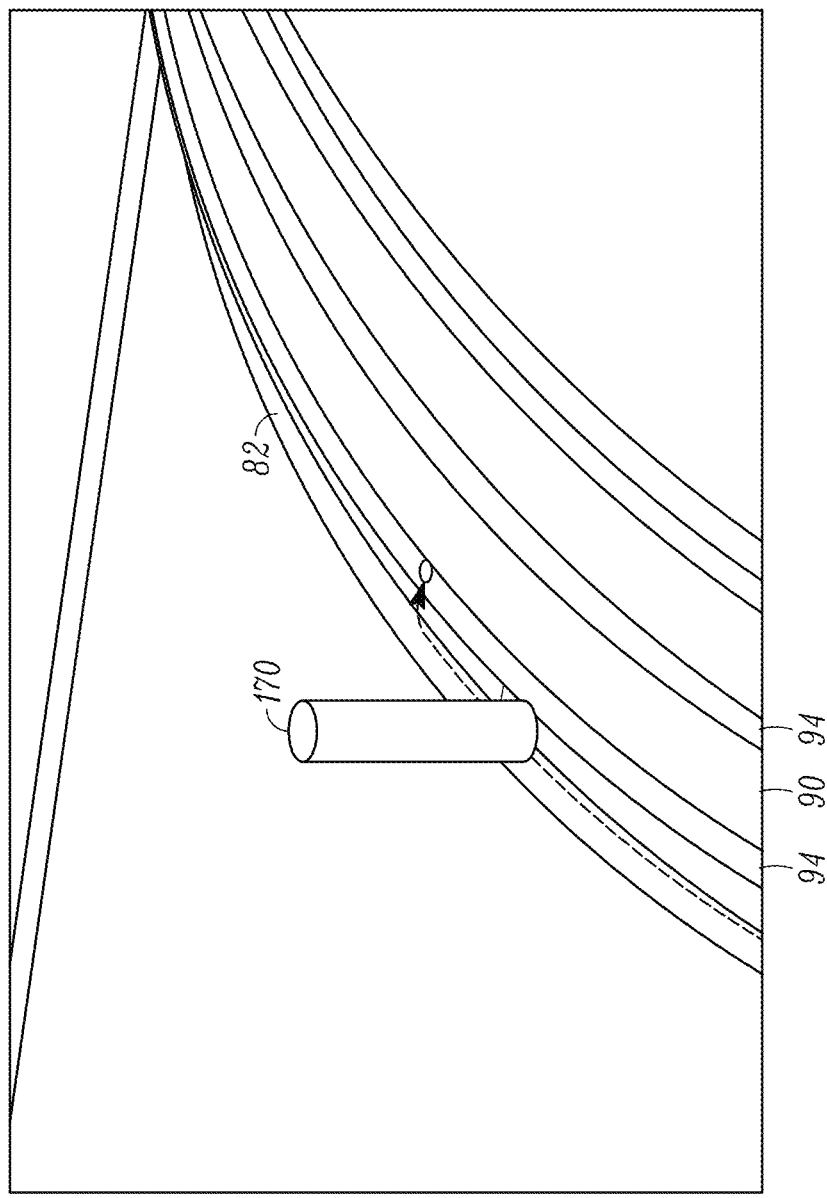

FIG. 15 illustrates another exemplary embodiment of removing the FSW pin tool.

Figure 7:
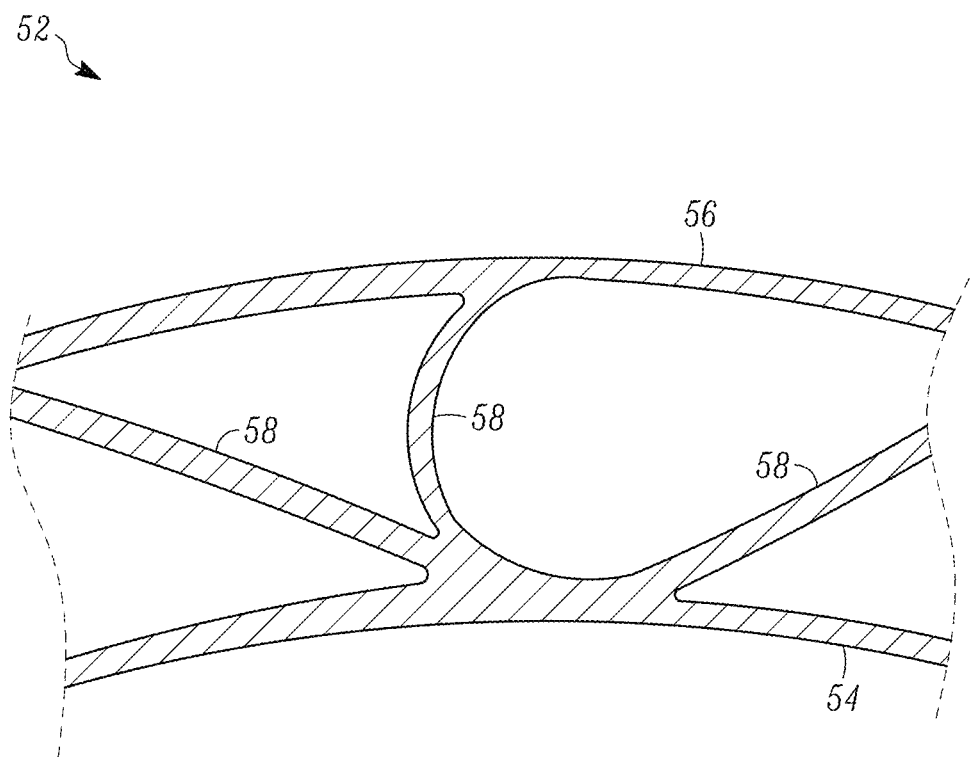
FIG. 7 illustrates a portion of another embodiment illustrating an extruded pipe segment that can be used to form a pipe section.
Figure 16:
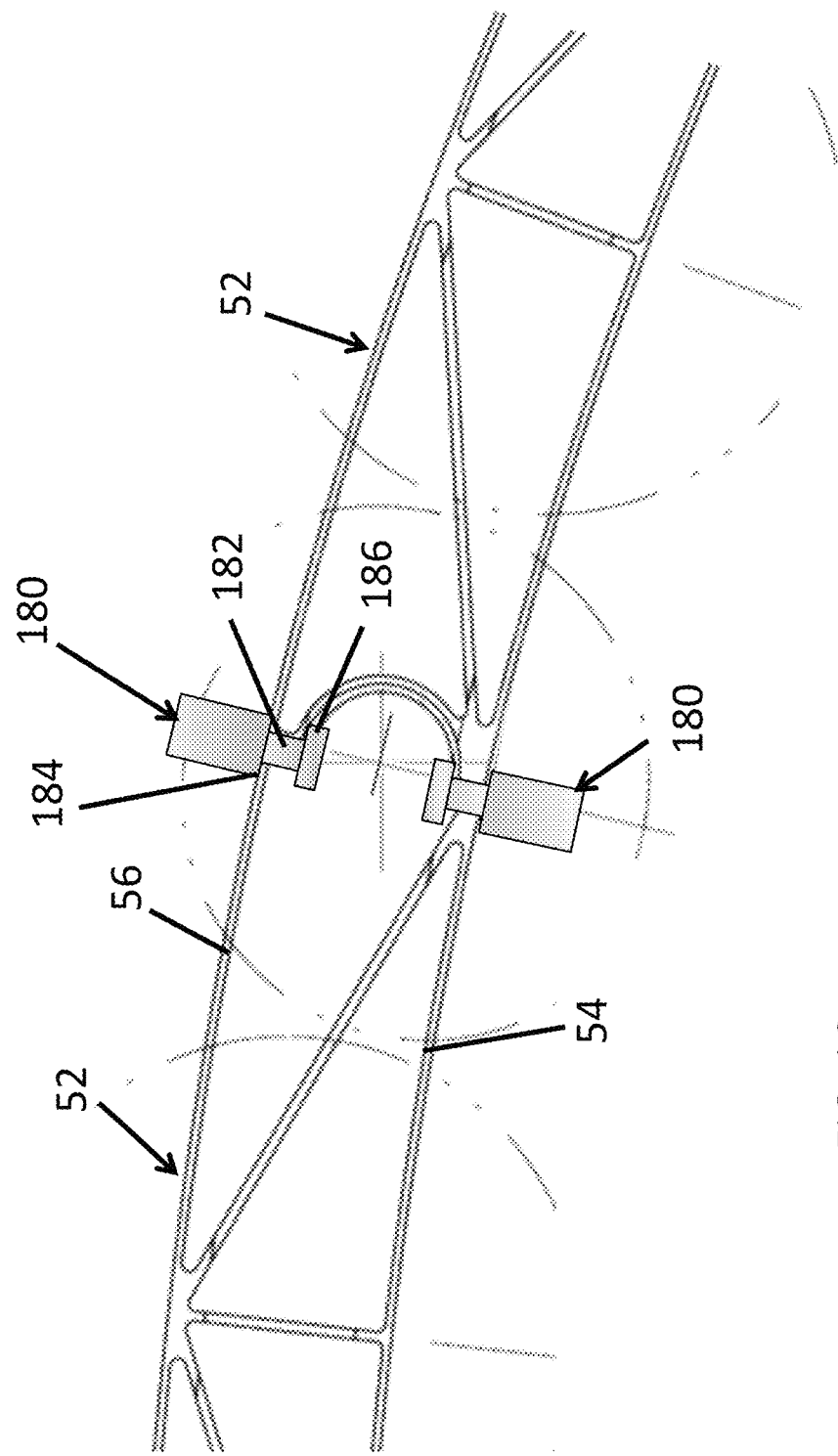

FIG. 16 illustrates the use of a self-reacting FSW tool for welding two adjacent extruded pipe segments shown in FIG. 7.

Figure 17:
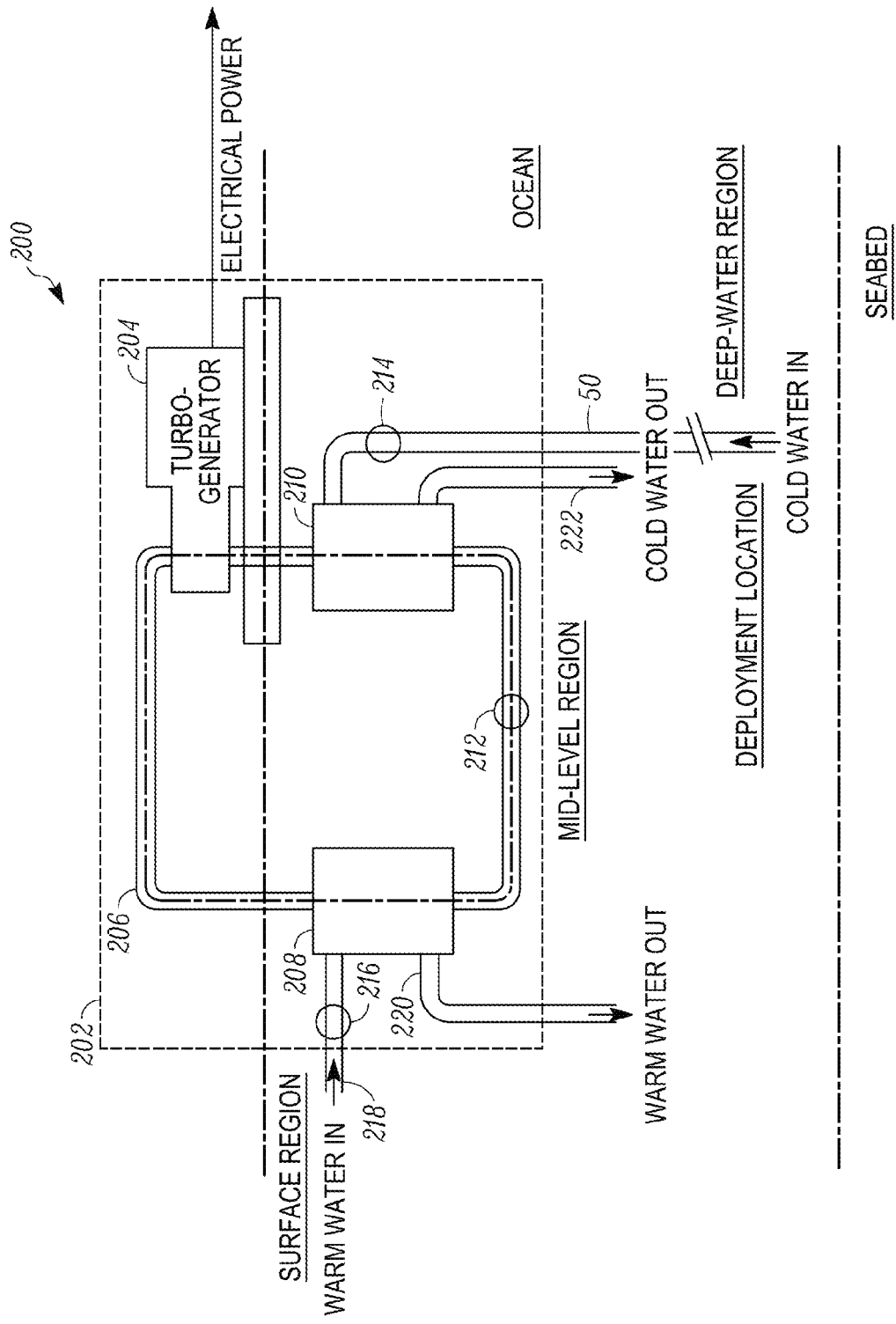

FIG. 17 illustrates an exemplary application of the pipe as a cold water pipe in an OTEC plant.

DETAILED DESCRIPTION

This disclosure describes fluid conveying pipes and processes of forming such pipes using the FSW process. The fluid conveying pipes are formed from one or more, for example a plurality of, pipe sections, with each pipe section including a first barrel coaxially and concentrically disposed within a second barrel. Each pipe section is constructed from one or more pipe segments with facing edges that are friction stir welded together along a seam(s) that extends longitudinally from a first end to a second end thereof. The resulting pipe section includes the first barrel coaxially and concentrically disposed within the second barrel and spaced from one another by one or more spacers.

FSW is a well-known method for joining two elements of the same or differing material. Conventional FSW employs a rotating probe or pin that is forced into the interface between the two elements. The immense friction between the probe and materials causes material in the immediate vicinity of the probe to heat up to temperatures below its melting point. This softens the adjoining sections, but because the material remains in a solid state, its original material properties are retained. Movement of the probe along the weld line forces the softened material from the two pieces towards the trailing edge causing the adjacent regions to fuse, thereby forming a weld.

As opposed to other common joining techniques, such as fusion welding, brazing, etc., FSW has several performance advantages. In particular, the resultant weld is comprised of the same material as the joined sections. As a result, galvanic corrosion due to contact between dissimilar metals at the joint can be reduced or eliminated. Furthermore, the resultant weld retains the material properties of the material of the joined sections.

Although in the illustrative embodiments FSW is used to join two elements that are formed of the same material, in some embodiments FSW can be used to weld elements that are formed of dissimilar materials.

Furthermore, although the illustrative embodiments comprises pipe sections and connecting rings that each are made of aluminum or aluminum alloy, it will be clear to one skilled in the art, after reading this specification, how to specify, make, and use alternative embodiments wherein materials other than aluminum are used. The materials used can include any suitable material including, but not limited to, aluminum and alloys thereof, titanium and alloys thereof, steel and alloys thereof such as stainless-steel, copper and alloys thereof, bronze and alloys thereof, plastics, and the like.

Figure 3:
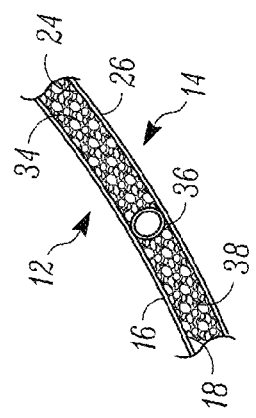
FIG. 3 is an enlarged, detailed top view of the portion of the pipe section of FIG. 1.
Figure 1:
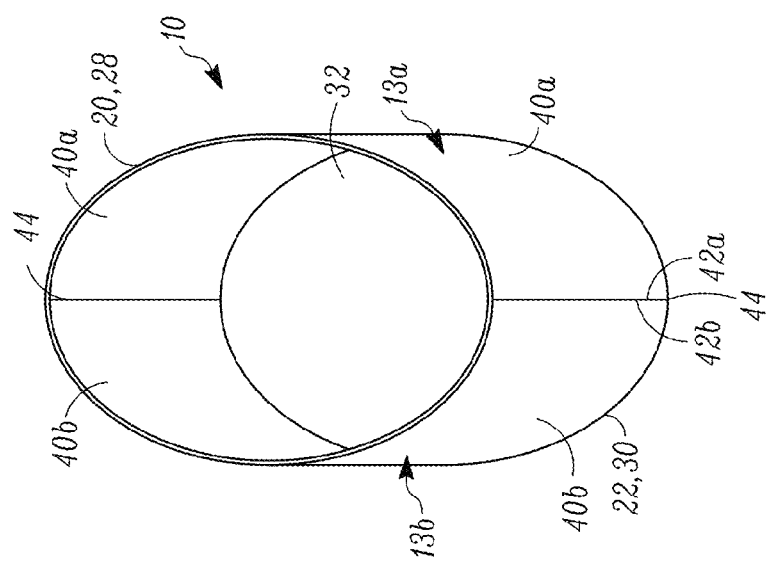
FIG. 1 is a perspective view of a pipe section according to one embodiment.

Turning to FIGS. 1 and 3, an exemplary embodiment of a pipe section 10 is illustrated. The pipe section 10 includes a first barrel 12 coaxially and concentrically disposed within a second barrel 14. The first barrel 12 includes an interior surface 16, an exterior surface 18, a first end 20 and a second end 22. Likewise, the second barrel 14 includes an interior surface 24 that faces the exterior surface 18, an exterior surface 26, a first end 28 and a second end 30. The interior surface 16 of the first barrel 12 forms a fluid passageway 32 for fluid that extends along a longitudinal axis from the first ends 20, 28 to the second ends 22, 30.

The barrels 12, 14, and the entire pipe section 10 itself, are illustrated as being substantially cylindrical. However, the barrels and the pipe section can have any cross-sectional shape that one desires to use for conveying a fluid. For example, the barrels and the pipe section could have an oval shape or could even be rectangular, triangular or the like. In addition, one barrel could have one shape while the other barrel could have a different shape. For example, the barrel 12 could be cylindrical while the barrel 14 is oval, or vice versa.

In addition, the exterior surface 18 of the first barrel 12 is spaced from the interior surface 24 of the second barrel 14 to form a gap 34 therebetween. A suitable spacer(s) is disposed within the gap 34 to maintain the gap and keep the first barrel spaced from the second barrel. The spacer can take any form (s) suitable for keeping the first barrel spaced from the second barrel. In the example illustrated in FIG. 3, the spacer comprises a plurality of spacer elements 36 that are disposed in the gap 34 and circumferentially spaced from one another around the circumference of the pipe section 10. Each spacer element 36 is in contact with the exterior surface 18 of the first barrel and the interior surface 24 of the second barrel to maintain the gap spacing. In one embodiment, the spacer elements 36 can be formed from extruded aluminum, and can have any shape (s) such as tubes (illustrated in FIG. 3), solid rods, U or V-shaped channels, etc. The spacer elements 36 are secured to the surfaces 18, 24, for example using an adhesive or via welding the spacer elements to the surfaces 18, 24.

FIG. 3 also illustrates an additional spacer in the form of lightweight foam filler material 38 that substantially fills the remainder of the gap 34 not occupied by the spacer elements 36. In one embodiment, the foam filler material 38 is structural foam such as an open cell, syntactic foam. In another embodiment, the foam filler material is closed cell foam. In one embodiment, the filler material 38 is sprayed onto the exterior surface 18 of the first barrel 12 and then the barrel 12 is placed inside of the second barrel 14 or the second barrel 14 placed around the first barrel 12. In another embodiment, the filler material 38 is sprayed into the gap 34 after the first barrel 12 is placed inside of the second barrel 14.

The spacer elements 36 and the filler material 38 need not be used together. Instead, either one could be used individually by itself to maintain the gap between the barrels 12, 14. In addition, if buoyancy of the pipe section 10 is desired, some or the entire gap 34 could be filled with a gas such as air to achieve a desired buoyancy characteristic of the pipe section.

As best seen in FIG. 1, the pipe section 10 is formed from two pipe segments 13a, 13b which, when connected, form the barrels 12, 14. Each pipe segment 13a, 13b is constructed from two separate plates 40a, 40b that can be rolled to form the desired diameter of each barrel 12, 14, with the diameter of the first barrel being less than the diameter of the second barrel to permit formation of the gap 34. Each barrel 12, 14 is then individually formed by using FSW to secure together longitudinal facing edges 42a, 42b of the plates 40a, 40b. The result is that the pipe segments 13a, 13b are connected by FSW so that each barrel 12, 14 includes two FSW seams 44 that extend from the first longitudinal end to the second longitudinal end thereof. FIG. 1 illustrates one of the two FSW seams 44 on the barrel 12 with the second seam on the barrel 12 being located diametrically opposite the visible FSW seam 44. FIG. 1 also illustrates one of the two FSW seams 44 on the barrel 14 with the second seam on the barrel 14 being located diametrically opposite the visible FSW seam 44.

Once the two barrels 12, 14 are individually assembled, the first barrel 12 can then be placed inside of the second barrel 14, with the spacer(s) then being installed (or the spacer(s) can be installed prior to inserting the first barrel into the second) to maintain the spacing between the barrels 12, 14.

In an alternative embodiment, each pipe segment 13a, 13b can be individually formed by securing the plates 40a and spacer(s) 36, 38 to one another and securing the plates 40b and spacer(s) to one another. The two pipe segment assemblies 13a, 13b can then be secured together along their facing edges 42a, 42 using FSW.

The use of the first barrel 12 inside of the second barrel 14 avoids having to use a single, thick plate to form each barrel that would be heavier and more expensive.

Figure 2:
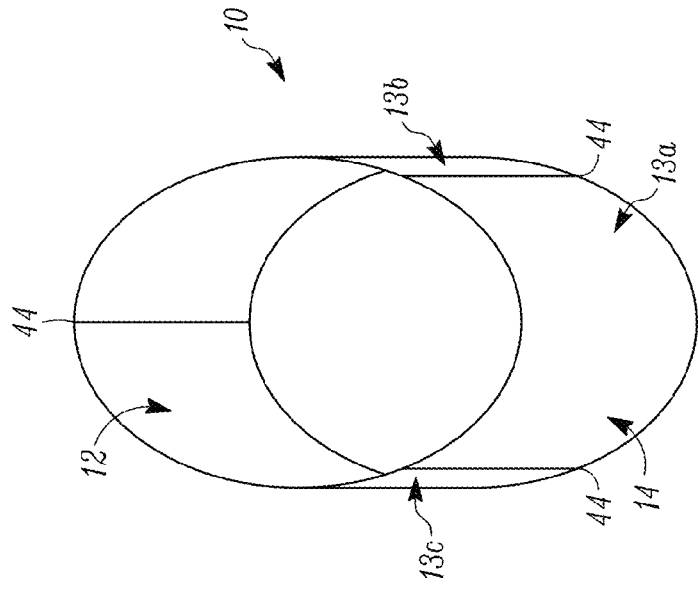
FIG. 2 is a perspective view of another embodiment of a pipe section.
Figure 4:
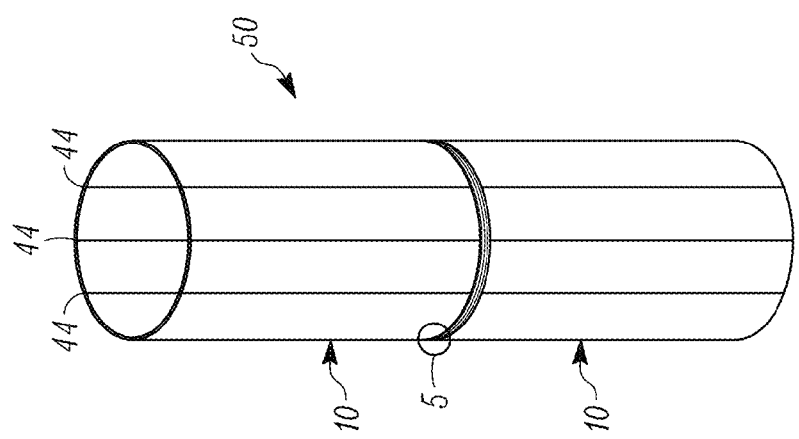
FIG. 4 is a perspective view of a portion of a fluid conveying pipe formed from a plurality of the pipe sections.

FIG. 2 illustrates another exemplary embodiment of the pipe section 10 that is constructed in a similar manner as the pipe section 10 including the barrels 12, 14. However, in this example, the pipe section 10 is formed from three pipe segments 13a, 13b, 13c, so that each of the barrels 12, 14 is formed from three separate plates each of which is rolled to form the desired diameter of each barrel 12, 14. Each barrel 12, 14 is then individually formed by using FSW to secure together longitudinal facing edges of the three plates. The result is that each barrel 12, 14 includes three FSW seams 44 that extend from the first longitudinal end to the second longitudinal end thereof. The pipe section 10 can be formed from any number of pipe segments, i.e. the barrels 12, 14 can be formed from any number of plates other than the two and three plates illustrated in FIGS. 1 and 2. For example, each barrel could be formed from one plate where the ends of the plates are welded together by FSW to form each barrel with a single FSW seam (i.e. the pipe section is formed from a single pipe segment). FIG. 4 illustrates an example where each pipe section is formed from 10 pipe segments so that the barrels are each formed from 10 plates with a resulting 10 FSW seams 44. Other number of plates can be used to form each barrel. In addition, the number of plates that form each barrel 12, 14 need not be the same, and the pipe sections 10 can be formed from barrels that are each formed from a different number of plates.

With reference to FIG. 7, an extruded pipe segment 52 that can be used to form the pipe section 10 is illustrated. In this embodiment, an inner plate 54 that contributes to forming the inner or first barrel, and outer plate 56 that contributes to forming the outer or second barrel, and the spacer(s) 58 are an integral extrusion, for example of aluminum or other suitable material, forming a single, one-piece construction. The pipe section can be formed from one or more of the pipe segments 52, where facing ends of the pipe segment(s) can be secured to one another by FSW to form the longitudinal FSW seams 44. The open space between the plates 54, 56 and the spacer(s) 58 can be filled with structural foam filler material as described above, or if buoyancy is desired, can be filled with a gas such as air to achieve a desired buoyancy characteristic of the pipe section.

With reference to FIG. 16, an exemplary technique for producing the FSW seams 44 on two adjacent extruded pipe segments 52 is illustrated. The technique illustrated in FIG. 16 is an example only and other suitable FSW techniques could be used. The pipe segments 52 are essentially hollow chambers which do not readily allow for a backing structure to be used to react forces from the FSW tool from the outside. Therefore, in the case of the extruded pipe segments, self-reacting friction stir welding can be used.

In FIG. 16, two bobbin-style FSW tools 180 are illustrated for producing the longitudinal FSW seams 44. The use and construction of bobbin-style FSW tools are known in the art, and generally include a probe 182, a top shoulder 184 and a bottom shoulder 186. During FSW, the tool 180 spins with high RPMs and starting at one end of the weld seam plunges into the seam, with each shoulder 184, 186 on opposite surfaces of the material. The tool travels along the seam to produce the FSW seam and then travels out the other end. This process requires no backing structure, and the pipe segments 52 only needs to be supported in the direction of tool travel.

The describe pipe section 10 permits the production of relatively lightweight pipes, and pipes that have a relatively large diameter. For example, for a cold water pipe in an OTEC plant, the pipe can have a diameter of up to 10 meters or even larger, for example a diameter between about 1 meter and about 10 meters. However, other diameters can be used depending upon the intended application of the pipe.

The extruded pipe segment 52 in FIG. 7 can be used with the connecting rings described below in FIGS. 5 and 6, and with all of the embodiments described herein.

With reference to FIG. 4, a portion of a fluid conveying pipe 50 is illustrated that is formed from a plurality, in the illustrated example two, of the pipe sections 10. The pipe 50 can be formed of any length by connecting a desired number of the pipe sections to one another end to end so that the fluid passageways 32 are coaxial to one another and then joining the pipe sections circumferentially with FSW.

The pipe sections 10 are connected to one another using a circumferentially continuous connecting ring. In general, the connecting ring is inserted into one of the pipe sections and circumferentially FSW from the inside and the outside to secure the ring. The next pipe section can then be installed onto the other end of the stiffener ring and FSW using the same procedure.

Figure 5:
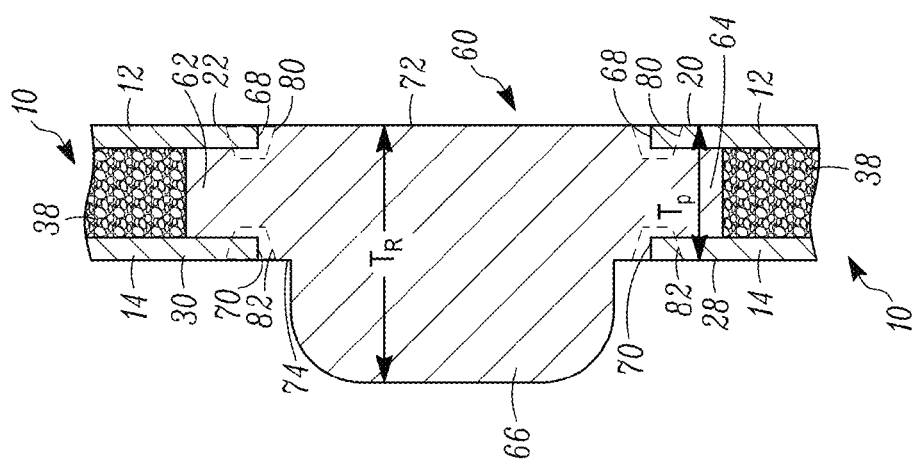
FIG. 5 is an enlarged cross-sectional view of the portion contained in the circle 5 of FIG. 4 showing one embodiment of a connecting ring joined to the ends of adjacent pipe sections.

FIG. 5 illustrates one example of a connecting ring 60. In this example, the ring 60 has a first end 62, a second end 64, and radially thick central portion 66. The ends 62, 64 have a reduced radial thickness that allows the ends to be inserted into and between the ends 20, 28 and 22, 30 of the barrels 12, 14. In one embodiment, the radial thickness of the ends 62, 64 is such that there is a close fitting relation with the exterior surface 18 of the ring 12 and the interior surface 24 of the ring 14 (i.e. there is little or no space between the ends 60, 62 and the surfaces 18, 24).

To permit the ends 62, 64 to be inserted between the barrels 12, 14, the foam filler material 38 is recessed from the ends 20, 28 and 22, 30 of the barrels. In addition, if the spacer elements 36 are present, the spacer elements can be recessed like the filler material 38 or the ring 60 can be provided with recesses to accommodate the ends of the spacer elements 36.

In addition, the ends of the barrels 12, 14 abut against shoulders 68, 70 formed on the ring 60 near the ends 62, 64. Thus, the inner surface 16 of the barrel 12 is flush with an inner surface 72 of the ring, and the exterior surface 26 of the barrel 14 is flush with a surface 74 of the ring. The result is that there are butt-lap joints between the ends 20, 28, 22, 30 of the barrels 12, 14 and the ends 62, 64 of the ring 60.

As shown by the dashed lines in FIG. 5, circumferential FSW is then applied at the butt-lap joint interfaces to form interior and exterior circumferential weld seams 80, 82.

The central portion 66 of the ring 60 has a radial thickness $T_R$ that is greater than a radial thickness $T_P$ of the two pipe sections measured between the interior surface 16 of the first barrel 12 and the exterior surface 26 of the second barrel 14. The central portion 66 renders the two pipe sections 10 relatively rigid which may be beneficial depending upon the expected loading on the pipe sections.

Figure 6:
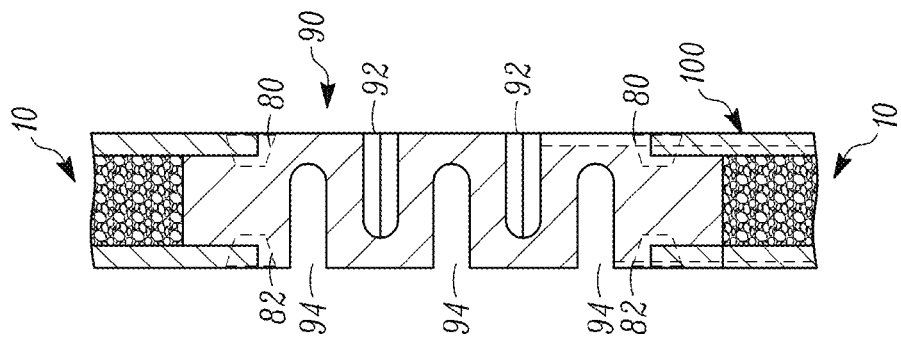
FIG. 6 is a view similar to FIG. 5 but showing another embodiment of a connecting ring between two adjacent pipe sections.

FIG. 6 illustrates another example of a connecting ring 90 that is shaped somewhat like a bellows ring to permit the ring 90 to flex, which permits the pipe sections 10 to flex relative to each other. This permits the ring 90 to relieve stresses that can be induced by, for example, ocean currents and tides.

In this example, the ring 90 has alternating interior facing and exterior facing channels 92, 94 that permit the flexing of the ring. The ring 90 is otherwise similar to the ring 60 and is connected to the barrels 12, 14 using the same butt-lap joints that are then circumferentially FSW to form the circumferential interior and exterior weld seams 80, 82.

As illustrated in dashed lines in FIG. 6, in some embodiments, for example in the case of a cold water pipe for an OTEC plant, the wall thickness of each barrel 12, 14 and the ring 90 may be made thinner 100 at greater depths of the pipe 50 but thicker at shallower depths. Also, the ring 90 may be thicker at greater depths and shallow depths of the pipe 50 but thinner in the middle sections of the pipe 50.

Returning to FIG. 4, the length of the pipe 50 is based on how many of the pipe sections 10 are connected together end to end. The specific length of the pipe formed will depend on factors such as the intended application of the pipe 50. For a cold water pipe in an OTEC plant, the pipe 50 can have a length of up to about 1000 meters or even larger. However, other pipe lengths can be used.

The pipe 50 can be assembled in and used in any desired orientation. In some embodiments the pipe 50 can be used in a generally vertical orientation, while in other embodiments the pipe 50 can be used in a horizontal orientation. In the case of a cold water pipe used in an OTEC plant, given the long length of the pipe which is typically oriented substantially vertically, it is advantageous to assemble the pipe sections 10 in situ or on site of the intended deployment of the cold water pipe.

FIGS. 8-12 illustrate an exemplary rigging structure 110 for assembling the pipe sections 10 end to end in a vertical orientation in situ. As each pipe section is added, the pipe 50 is sequentially lowered vertically and the next pipe section is added to the top end of the pipe until the desired pipe length is obtained. A rigging structure for gripping a pipe, and sequentially lower the pipe vertically in order to add a new pipe section to the top end of the pipe is available from Makai Ocean Engineering of Kailua, Hi. and described by Makai Ocean Engineering as Grippers (see http://www.makai.com/otec-ocean-thermal-energy-conversion/).

With reference to FIG. 8, the rigging structure 110 includes a fixed lower platform 112 and a removable upper platform 114. The upper platform 114 is spaced from the lower platform 112 via a plurality of support legs 116. The upper platform 114 can be removed to permit a new pipe section 10 to be introduced into the rigging structure for connection to top end of the next lower pipe section 10.

Figure 12:
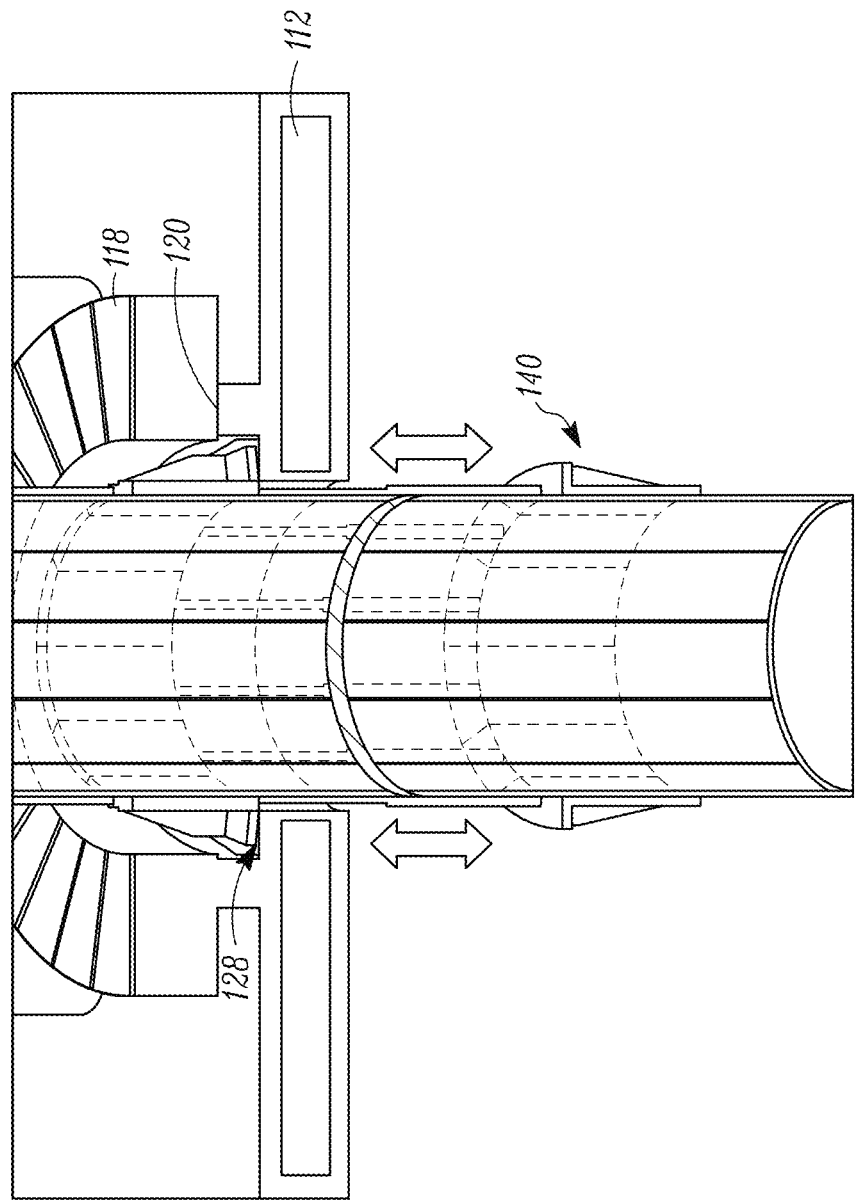
FIG. 12 illustrates operation of the rigging structure for sequentially lowering the pipe sections as they are added to the top end of the pipe.

As best seen in FIGS. 8, 9 and 12, a turntable 118 is rotatably disposed on the lower platform 112. The turntable 118 can be made to rotate in any manner relative to the platform, for example using a system of gear teeth 120 (FIG. 12) between the turntable 118 and the platform 112.

An external pipe support structure 122 is provided on the lower platform 112 for surrounding the pipe 50 and helping to align the pipe with the next pipe section 10 to be added. In the illustrated example, and best visible in FIGS. 9-11, the pipe support structure 122 includes a circumferential ring 124 that surrounds the end of the pipe, and a plurality of circumferentially spaced, axial support members 126 that are fixed at one end to the ring 124 and fixed at their opposite ends to an upper gripper mechanism 128. The gripper mechanism 128 is similar to the Makai Ocean Engineering gripper and includes a plurality of circumferential pads that can be actuated to radially squeeze and release the outer diameter of the pipe.

The upper platform 114 is designed to support the pipe section 10 that is to be added in position relative to the upper end of the pipe 50 that is supported by the lower platform 112. The upper platform 144 includes an external pipe support structure 130 that is generally similar to the pipe support structure 122 and that is supported thereby and extends downwardly therefrom. The support structure 130 is configured to surround the pipe section 10 to be added and help align the pipe section with the pipe 50. In the illustrated example, and best visible in FIGS. 8-11, the pipe support structure 130 includes a circumferential ring 132 that surrounds the end of the pipe section 10, and a plurality of circumferentially spaced, axial support members 134 that are fixed at one end to the ring 132 and fixed at their opposite ends to the upper platform 114.

Figure 11:
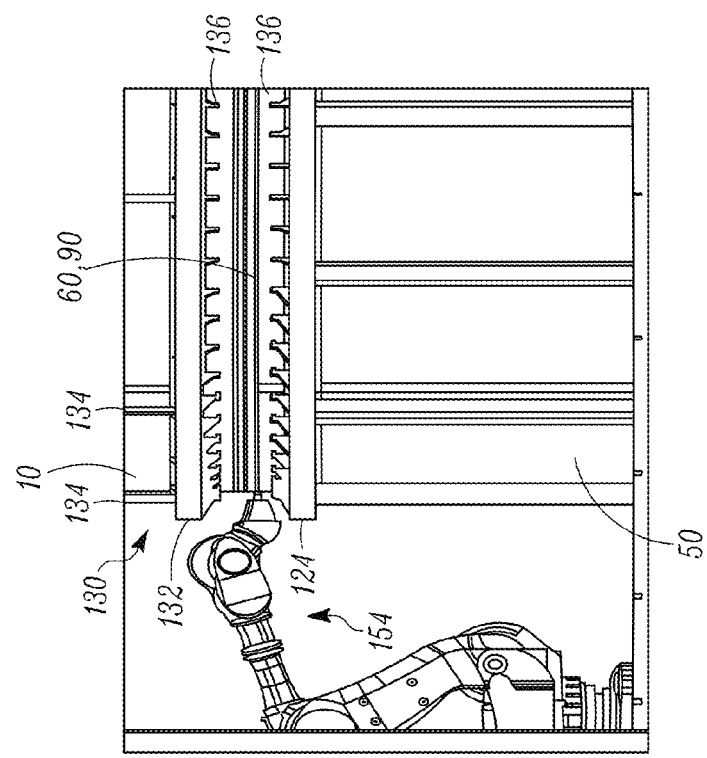
FIG. 11 illustrate the support structures for supporting the pipe sections on the rigging structure.

As best seen in FIG. 11, each of the rings 124, 132 can include a plurality of circumferentially spaced, radially inward and outward actuatable fingers 136. The fingers 136 can be actuated to clamp onto the ends of the pipe 50 and pipe section 10 to help retain the pipe and pipe section in alignment. In addition, each finger 136 can be individually adjusted to selectively adjust the pressure applied by each finger 136.

The lower platform 112 also includes a lower gripper mechanism 140, also similar to the Makai Ocean Engineering gripper, and that includes a plurality of circumferential pads that can be actuated to radially squeeze and release the outer diameter of the pipe 50. The gripper mechanism 140 is also actuatable vertically up and down as indicated by the arrows in FIG. 12.

To lower the pipe 50 as each pipe section 10 is added, the upper gripper mechanism 128 is released while the lower gripper mechanism 140 is actuated to radially grip the pipe 50. The gripper mechanism 140 is then moved downwardly to lower the pipe. The upper gripper mechanism 128 is then actuated to radially grip the pipe and the lower gripper mechanism is released and moved back vertically upward. The process can then be repeated to lower the pipe 50 the desired distance. Once the pipe is sufficiently lowered, the next pipe section 10 can then be positioned in the rigging structure to be attached to the top end of the pipe 50.

Figure 10:
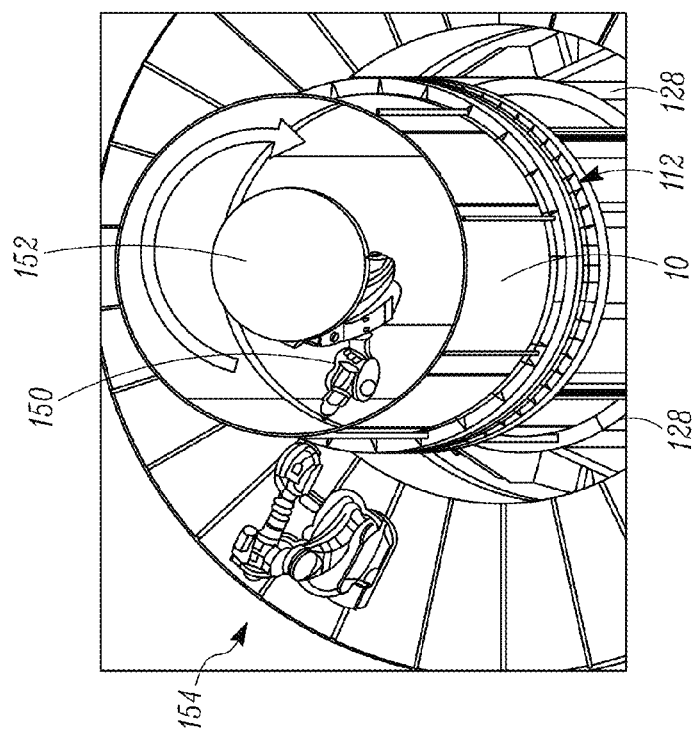
FIG. 10 is a top perspective view of the interior of the pipe with a portion of the rigging removed to better show the internal FSW tool.

As described above, the pipe sections 10 are connected end to end using the connecting ring and by using FSW to create circumferential welds 80, 82. With reference to FIGS. 9 and 10, to create the interior circumferential welds 80, an internal FSW tool 150 can be mounted on a rotatable boom 152 from the upper platform 114. The internal FSW tool 150 is disposed inside the pipe 50/pipe section 10 and can be rotated circumferentially as indicated by the arrow in FIG. 10 to create the internal circumferential welds 80. An external FSW tool 154 is disposed on the turntable 118 to be circumferentially rotated by the turntable to create the exterior circumferential welds 82 as the turntable rotates.

The internal and external FSW tools 150, 154 can be any suitable FSW tools known in the art. An example of a suitable FSW tool is the ESAB Rosio that employs an ABB Robotics heavy duty robotic arm, available from ESAB of London, England.

The FSW tools 150, 154 can utilize either fixed pin or retractable pin designs. In addition, while the external FSW tool 154 is welding, the internal FSW tool 150 can be deployed on the opposite interior surface with suitable tooling, such as an anvil ball or roller, to react the loads being applied by the external FSW tool. Likewise, while the internal FSW tool 150 is welding, the external FSW tool can be deployed on the opposite exterior surface with suitable tooling, such as an anvil ball or roller, to react the loads being applied by the internal FSW tool. Examples of structures for reacting loads on external and internal surfaces of pipes during FSW are disclosed in U.S. Patent Application Publication No. 2008/0029578. It is also possible that both FSW tools 150, 154 can weld at the same time so that each FSW tool reacts the loads from the other FSW tool.

Figure 13:
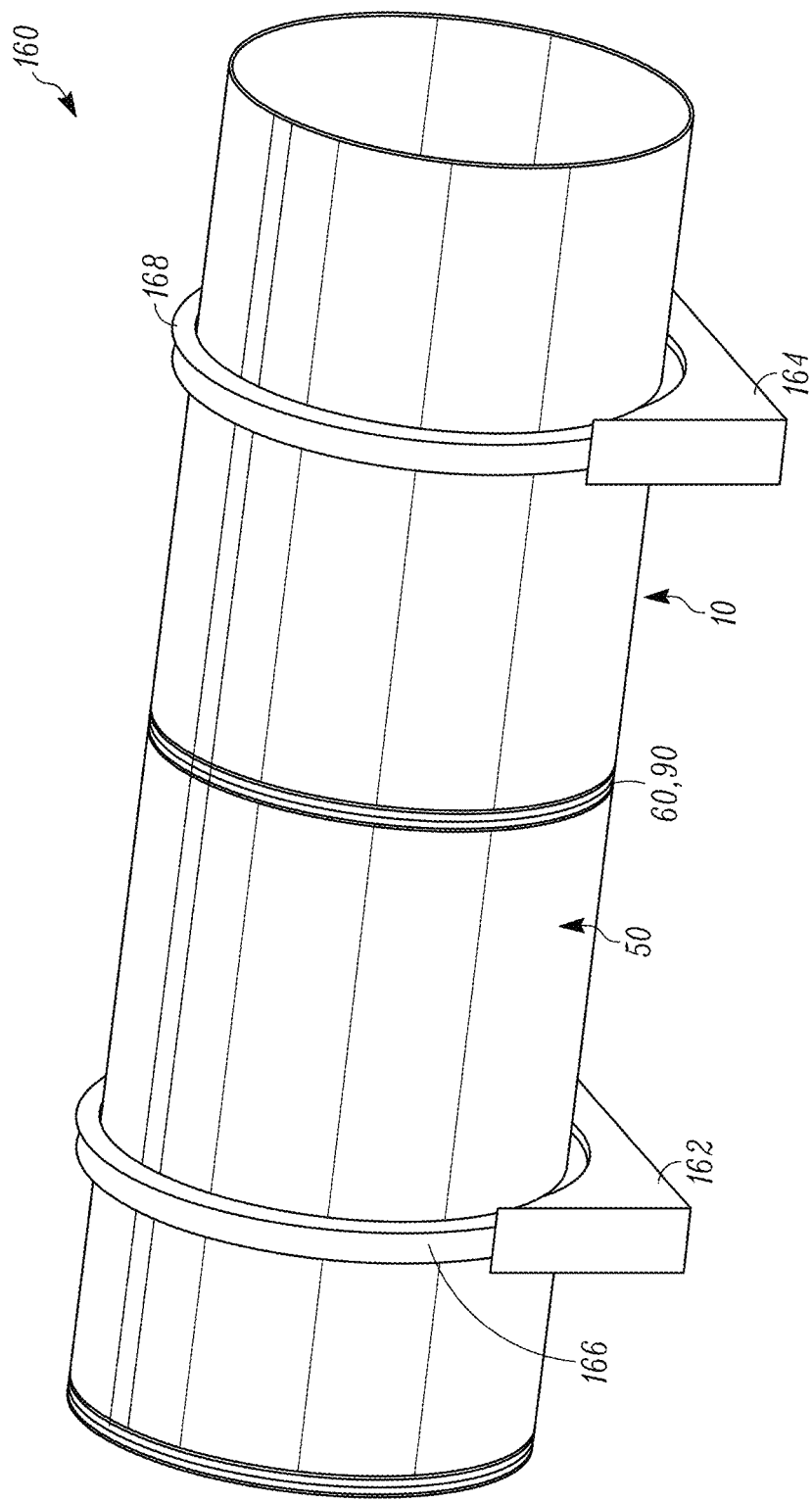
FIG. 13 illustrates rigging structure that can be used to FSW two horizontally oriented pipe sections to one another.

FIG. 13 illustrates a rigging structure 160 that can be used to support the pipe and pipe section 10 in a horizontal orientation for FSW. The rigging structure 160 includes a first support 162 supporting the pipe 50 on one side of the joint, and a second support 164 supporting the pipe section 10 on the other side of the joint. Clamping structures 166, 168 can be provided to clamp on to the pipe 50 and the pipe section to help retain alignment between the pipes. Further information on rigging structures and clamping structure for supporting pipes in a horizontal orientation during FSW are disclosed in U.S. Patent Application Publication No. 2008/0029578.

Internal and external FSW tools, similar to the FSW tools 150, 154, can then be used to produce the internal and external circumferential welds 80, 82.

With reference to FIGS. 14A-D, to help remove the pin of the FSW tool at the end of the circumferential weld path, a pin removal feature can be employed. In particular, with reference to FIG. 14A, as the pin 170 of the FSW tool is nearing the end of the exterior circumferential weld path between one end of the connecting ring 90 and the end of the pipe 50 or pipe section 10, an off-ramp 172 is secured, for example welded, to the exterior of the joint between the ring 90 and the pipe/pipe section where the exterior FSW weld joint 82 began.

Figure 14A:
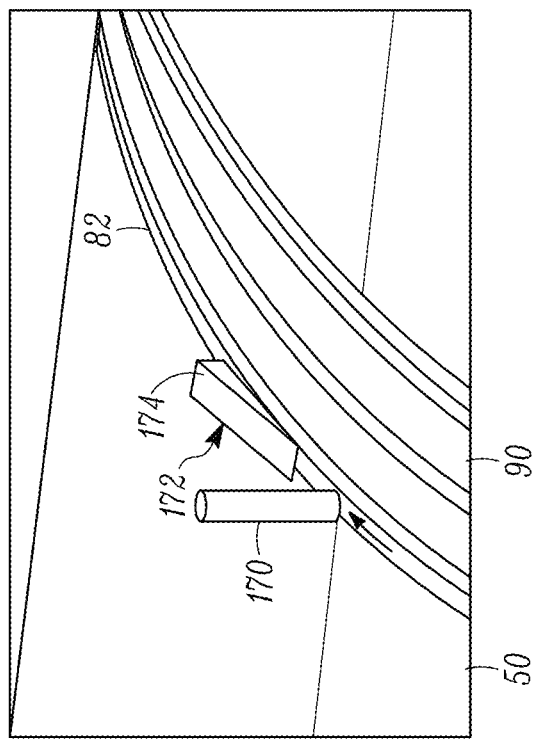
Figure 14B:
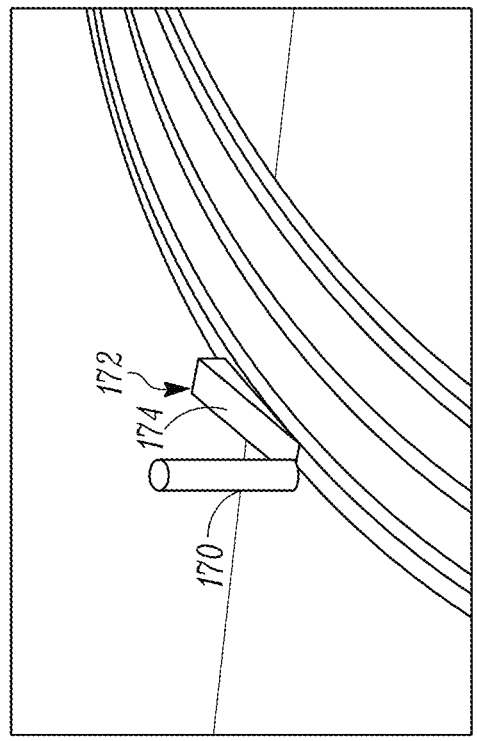
Figure 14C:
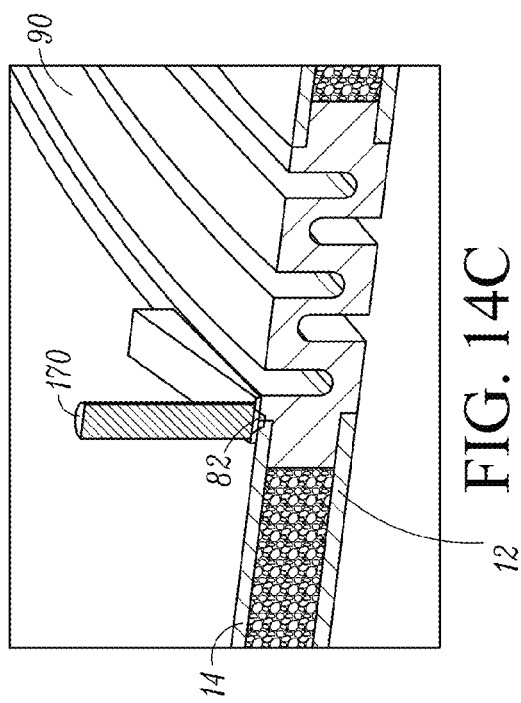
Figure 14D:
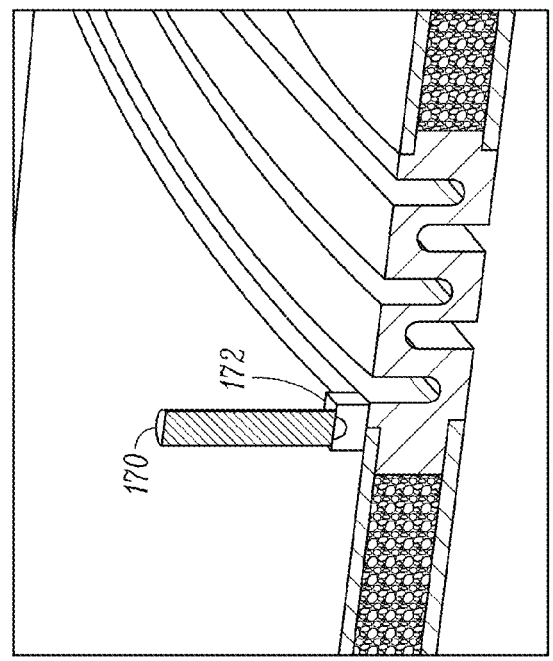

In the illustrated example, the off-ramp 172 is a wedge-shaped structure with a ramp surface 174, and with the point of the wedge facing toward the oncoming pin 170. With reference to FIG. 14B, the pin 170 continues to travel toward the off-ramp 172 to complete the weld 82. Once the weld 82 is complete, the pin 170 encounters the off-ramp 172 and follows the ramp surface 174 to transition from welding the barrel 14/ring 90 into just welding into the off-ramp 172. FIG. 14C shows the pin 170 partially penetrated into the barrel 14/ring 90 as the pin 170 moves up the off-ramp 172. FIG. 14D illustrates the pin 170 at the end of the off-ramp 172 fully penetrated into the ramp material. Once the pin is no longer welding the barrel 14/ring 90 interface, the pin 170 can be withdrawn and the off-ramp 172 can be removed, for example by machining or grinding the off-ramp off of the pipe, or the off-ramp 172 can be left in place if it will not interfere with the end application of the pipe.

A similar off-ramp can also be used for the weld path at the other end of the ring 90. In addition, in some embodiments, off-ramps can be used for the interior welds inside the pipe. Although FIGS. 14A-D illustrate the connecting ring 90, the off-ramp concept can be used with other connecting rings including the connecting ring 60 in FIG. 5.

FIG. 15 illustrates another technique of removing the FSW pin 170 at the end of the weld path. In this embodiment, the FSW pin 170 is caused to tail out into a thick part of the ring 90 (i.e. a section next to the exterior channel 94) away from the weld seam 82. If desired, the FSW pin 170 could travel into the exterior channel 94. In this example, the pin 170 will leave a divot on the exterior of the ring 90. But the divot will not cause a fluid leak since it is far enough away from the barrel/ring weld seam 82. This tail out technique could also be used with other connecting rings including the connecting ring 60 in FIG. 5.

FIG. 17 illustrates an exemplary application of the pipe 50. In this example, the pipe 50 is used as a cold water intake pipe in an OTEC plant 200. However, it is to be realized that the pipe is not limited to use in an OTEC plant 200, but instead can be used in any fluid conveying application.

In general, the OTEC plant 200 includes an offshore platform 202, a turbogenerator 204, a closed-loop conduit 206, an evaporator 208, a condenser 210, a plurality of pumps 212, 214, and 216, the cold water intake pipe 50, and fluid pipes 218, 220, and 222. The closed-loop conduit 206 is a conduit for conveying working fluid through the evaporator, the condenser, and the turbogenerator.

Any of the pipes 218, 220, 22 and the closed-loop conduit 206 can be formed in a similar manner as the pipe 50.

The layout of the OTEC plant 200 is conventional and the construction and operation of an OTEC plant is well known to those of ordinary skill in the art. The OTEC plant 200 can be deployed in any suitable body of water such as an ocean, sea, a salt or fresh water lake, etc.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A fluid conveying pipe, comprising:
a pipe section that includes:
a first barrel coaxially and concentrically disposed within a second barrel, the first barrel and the second barrel each including an interior surface, an exterior surface, a first end and a second end;
the interior surface of the first barrel forming a fluid passageway that extends along a longitudinal axis, and the exterior surface of the first barrel is spaced from the interior surface of the second barrel to form a gap therebetween;
a spacer disposed within the gap to space the first barrel from the second barrel; and
wherein each of the first barrel and the second barrel are formed from at least two plates, and further comprising a plurality of friction stir welded seams that extend from the first end to the second end of each of the first barrel and the second barrel, the plurality of friction stir welded seams connecting the at least two plates to one another to form the first barrel and the second barrel.

2. The fluid conveying pipe of claim 1, wherein the first barrel and the second barrel are formed from aluminum, aluminum bronze, titanium, steel, copper and alloys thereof, or plastic.

3. The fluid conveying pipe of claim 1, wherein the spacer comprises a foam material disposed within and substantially filling the gap between the first barrel and the second barrel.

4. The fluid conveying pipe of claim 1, wherein the spacer comprises a plurality of spacer elements disposed in the gap, the spacer elements are circumferentially spaced from one another, and each spacer element is in contact with the exterior surface of the first barrel and the interior surface of the second barrel.

5. The fluid conveying pipe of claim 1, wherein the first barrel and the second barrel are substantially cylindrical.

6. The fluid conveying pipe of claim 3, wherein the foam material is open cell, syntactic foam or closed cell foam.

7. The fluid conveying pipe of claim 4, further comprising one or more of air or other gases, and water or other near incompressible/incompressible fluid filling the gap, and the pipe section is buoyant.

8. The fluid conveying pipe of claim 1, wherein the pipe section is formed from at least one extruded plate that defines at least a portion of the first barrel, at least a portion of the second barrel, and at least a portion of the spacer.

9. The fluid conveying pipe of claim 1, further comprising two of the pipe sections connected to one another end to end so that the fluid passageways are coaxial to one another.

10. The fluid conveying pipe of claim 9, wherein the two pipe sections are connected to one another by a connecting ring, the connecting ring has one end that is friction stir welded circumferentially to the first end of the first barrel and to the first end of the second barrel of a first one of the two pipe sections, and the connecting ring has an opposite end that is friction stir welded circumferentially to the second end of the first barrel and to the second end of the second barrel of a second one of the two pipe sections.

11. The fluid conveying pipe of claim 10, wherein the connecting ring is configured to allow the two pipe sections to flex relative to each other.

12. The fluid conveying pipe of claim 10, wherein the connecting ring has a radial thickness that is greater than a radial thickness of the two pipe sections measured between the interior surface of the first barrel and the exterior surface of the second barrel.

13. The fluid conveying pipe of claim 10, wherein:
for the first pipe section, the one end of the connecting ring is disposed between the first barrel and the second barrel at the first end thereof, there are first butt-lap joints between the one end and the first barrel and the second barrel, and the circumferential friction stir weld is at the first butt-lap joints; and
for the second pipe section, the opposite end of the connecting ring is disposed between the first barrel and the second barrel at the second end thereof, there are second butt-lap joints between the opposite end and the first barrel and the second barrel, and the circumferential friction stir weld is at the second butt-lap joints.

14. A method of forming a fluid conveying pipe, comprising:
forming a pipe section by:
forming an inner barrel and an outer barrel separately from one another by friction stir welding adjacent longitudinal edges on one or more plates to create on each of the inner barrel and the outer barrel a friction stir welded seam that extends longitudinally from a first end to a second end of each of the first barrel and the second barrel; and
the inner barrel and the outer barrel each include an interior surface and an exterior surface, and arranging the inner barrel coaxially and concentrically within the outer barrel with a gap therebetween, and providing a spacer in the gap that spaces the inner barrel from the outer barrel.

15. The method of claim 14, comprising forming the pipe section by friction stir welding adjacent longitudinal edges on a plurality of extruded pipe segments, each extruded pipe segment includes inner walls, outer walls and the spacer integrally formed as a one-piece construction.

16. The method of claim 14, wherein using a spacer to space the inner barrel from the outer barrel comprises disposing a foam material between the inner barrel and the outer barrel to substantially fill the gap between the inner barrel and the outer barrel.

17. The method of claim 14, wherein using the spacer to space the inner barrel from the outer barrel comprises disposing a plurality of spacer elements between the inner barrel and the outer barrel, the spacer elements are circumferentially spaced from one another, and each spacer element is in contact with the exterior surface of the inner barrel and the interior surface of the outer barrel.

18. The method of claim 14, comprising forming each of the inner barrel and the outer barrel from at least two plates; and for each of the inner barrel and the outer barrel, friction stir welding adjacent longitudinal edges of at least two plates to connect the at least two plates and create on each of the inner barrel and the outer barrel a plurality of friction stir welded seams that extend longitudinally from the first end to the second end of each of the inner barrel and the outer barrel.

19. The method of claim 14, further comprising forming two of the pipe sections, and connecting the two pipe sections to one another end to end so that the fluid passageways are coaxial to one another.

20. The method of claim 19, further comprising connecting the two pipe sections to one another by a connecting ring; friction stir welding one end of the connecting ring circumferentially to the first end of the inner barrel and to the first end of the outer barrel of a first pipe section of the two pipe sections, and friction stir welding an opposite end of the connecting ring circumferentially to the second end of the inner barrel and to the second end of the outer barrel of a second pipe section of the two pipe sections.

21. The method of claim 20, wherein the connecting ring is configured to allow the two pipe sections to flex relative to each other.

22. The method of claim 20, wherein:
for the first pipe section, disposing the one end of the connecting ring between the inner barrel and the outer barrel at the first end thereof, with first butt-lap joints between the one end and the inner barrel and the outer barrel, and the circumferential friction stir weld is at the first butt-lap joints; and
for the second pipe section, disposing the opposite end of the connecting ring between the inner barrel and the outer barrel at the second end thereof, with second butt-lap joints between the opposite end and the inner barrel and the outer barrel, and the circumferential friction stir weld is at the second butt-lap joints.

23. The method of claim 14, further comprising adjusting a buoyancy of the pipe section by filling the gap with one or more of air or other gases, and water or other near-incompressible/incompressible fluid.

24. A fluid conveying pipe, comprising:
a pipe section that includes:
a first barrel coaxially and concentrically disposed within a second barrel, the first barrel and the second barrel each including an interior surface, an exterior surface, a first end and a second end;
the interior surface of the first barrel forming a fluid passageway that extends along a longitudinal axis, and the exterior surface of the first barrel is spaced from the interior surface of the second barrel to form a gap therebetween;
a spacer disposed within the gap to space the first barrel from the second barrel;
each of the first barrel and the second barrel includes a friction stir welded seam that extends from the first end to the second end thereof; and
wherein the pipe section is formed from at least one extruded plate that defines at least a portion of the first barrel, at least a portion of the second barrel, and at least a portion of the spacer.

25. A fluid conveying pipe, comprising:
a plurality of pipe sections, each pipe section including:
a first barrel coaxially and concentrically disposed within a second barrel, the first barrel and the second barrel each including an interior surface, an exterior surface, a first end and a second end;
the interior surface of the first barrel forming a fluid passageway that extends along a longitudinal axis, and the exterior surface of the first barrel is spaced from the interior surface of the second barrel to form a gap therebetween;
a spacer disposed within the gap to space the first barrel from the second barrel; and
each of the first barrel and the second barrel includes a friction stir welded seam that extends from the first end to the second end thereof;
a first pipe section of the plurality of pipe sections and a second pipe section of the plurality of pipe sections connected to one another end to end so that respective fluid passageways of the first pipe section and the second pipe section are coaxial to one another; and
a connecting ring that connects the first pipe section to the second pipe section, the connecting ring having one end that is friction stir welded circumferentially to the first end of the first barrel of the first pipe section and to the first end of the second barrel of the first pipe section, and the connecting ring having an opposite end that is friction stir welded circumferentially to the second end of the first barrel of the second pipe section and to the second end of the second barrel of the second pipe section, wherein the connecting ring is configured to allow the first pipe section and the second pipe section to flex relative to each other.

26. A fluid conveying pipe, comprising:
a plurality of pipe sections, each pipe section including:
a first barrel coaxially and concentrically disposed within a second barrel, the first barrel and the second barrel each including an interior surface, an exterior surface, a first end and a second end;
the interior surface of the first barrel forming a fluid passageway that extends along a longitudinal axis, and the exterior surface of the first barrel is spaced from the interior surface of the second barrel to form a gap therebetween;
a spacer disposed within the gap to space the first barrel from the second barrel; and
each of the first barrel and the second barrel includes a friction stir welded seam that extends from the first end to the second end thereof;
a first pipe section of the plurality of pipe sections and a second pipe section of the plurality of pipe sections connected to one another end to end so that respective fluid passageways of the first pipe section and the second pipe section are coaxial to one another; and
a connecting ring that connects the first pipe section to the second pipe section, the connecting ring having one end that is friction stir welded circumferentially to the first end of the first barrel of the first pipe section and to the first end of the second barrel of the first pipe section, and the connecting ring having an opposite end that is friction stir welded circumferentially to the second end of the first barrel of the second pipe section and to the second end of the second barrel of the second pipe section, wherein the connecting ring has a radial thickness that is greater than a radial thickness of the first pipe section and the second pipe section measured between the interior surface of the first barrel and the exterior surface of the second barrel.

27. A fluid conveying pipe, comprising:
a plurality of pipe sections, each pipe section including:
a first barrel coaxially and concentrically disposed within a second barrel, the first barrel and the second barrel each including an interior surface, an exterior surface, a first end and a second end;
the interior surface of the first barrel forming a fluid passageway that extends along a longitudinal axis, and the exterior surface of the first barrel is spaced from the interior surface of the second barrel to form a gap therebetween;
a spacer disposed within the gap to space the first barrel from the second barrel; and
each of the first barrel and the second barrel includes a friction stir welded seam that extends from the first end to the second end thereof;
a first pipe section of the plurality of pipe sections and a second pipe section of the plurality of pipe sections connected to one another end to end so that respective fluid passageways of the first pipe section and the second pipe section are coaxial to one another; and a connecting ring that connects the first pipe section to the second pipe section, the connecting ring having one end that is friction stir welded circumferentially to the first end of the first barrel of the first pipe section and to the first end of the second barrel of the first pipe section, and the connecting ring having an opposite end that is friction stir welded circumferentially to the second end of the first barrel of the second pipe section and to the second end of the second barrel of the second pipe section;

wherein for the first pipe section, the one end of the connecting ring is disposed between the first barrel and the second barrel at the first end of the first pipe section, there are first butt-lap joints between the one end of the connecting ring and the first barrel and the second barrel, and the circumferential friction stir weld is at the first butt-lap joints; and wherein for the second pipe section, the opposite end of the connecting ring is disposed between the first barrel and the second barrel at the second end of the second pipe section, there are second butt-lap joints between the opposite end of the connecting ring and the first barrel and the second barrel, and the circumferential friction stir weld is at the second butt-lap joints.

28. A method of forming a fluid conveying pipe, comprising:
forming a pipe section by friction stir welding adjacent longitudinal edges on longitudinally facing edges of inner walls and outer walls of a plurality of extruded pipe segments from a first end to a second end of the extruded pipe segments, each extruded pipe segment including an inner wall, an outer wall, and a spacer integrally formed as a one-piece construction, the spacer spacing the inner wall from the outer wall, the inner walls forming an inner barrel and the outer walls forming an outer barrel, the inner barrel and the outer barrel each including an interior surface and an exterior surface, the inner barrel arranged coaxially and concentrically within the outer barrel.

29. A method of forming a fluid conveying pipe, comprising:
forming a plurality of pipe sections by, for each pipe section:
friction stir welding adjacent longitudinal edges on longitudinally facing edges of inner walls and outer walls of at least one pipe segment to thereby form an inner barrel and an outer barrel each of which includes a friction stir welded seam that extends longitudinally from a first end to a second end of each of the inner barrel and the outer barrel; and
the inner barrel and the outer barrel each include an interior surface and an exterior surface, and arranging the inner barrel coaxially and concentrically within the outer barrel with a gap therebetween, and providing a spacer in the gap that spaces the inner barrel from the outer barrel;
connecting a first pipe section of the plurality of pipe sections to a second pipe section of the plurality of pipe sections end to end by a connecting ring so that fluid passageways of the first pipe section and the second pipe section are coaxial to one another;
friction stir welding one end of the connecting ring circumferentially to the first end of the inner barrel of the first pipe section and to the first end of the outer barrel of the first pipe section;
friction stir welding an opposite end of the connecting ring circumferentially to the second end of the inner barrel of the second pipe section and to the second end of the outer barrel of the second pipe section; and
wherein the connecting ring is configured to allow the first pipe section to flex relative to the second pipe section.

30. A method of forming a fluid conveying pipe, comprising:
forming a plurality of pipe sections by, for each pipe section:
friction stir welding adjacent longitudinal edges on longitudinally facing edges of inner walls and outer walls of the respective pipe segment to thereby form an inner barrel and an outer barrel each of which includes a friction stir welded seam that extends longitudinally from a first end to a second end of each of the inner barrel and the outer barrel; and
the inner barrel and the outer barrel each include an interior surface and an exterior surface, and arranging the inner barrel coaxially and concentrically within the outer barrel with a gap therebetween, and providing a spacer in the gap that spaces the inner barrel from the outer barrel;
connecting a first pipe section of the plurality of pipe sections to a second pipe section of the plurality of pipe sections end to end by a connecting ring having a first end and a second end so that fluid passageways of the first pipe section and the second pipe section are coaxial to one another by:
disposing the first end of the connecting ring between the inner barrel and the outer barrel at a first end of the first pipe section, the first end of the connecting ring forming first butt-lap joints with the inner barrel of the first pipe section and the outer barrel of the first pipe section at the first end of the first pipe section;
friction stir welding the first end of the connecting ring circumferentially to the first end of the first pipe section at the first butt-lap joints;
disposing the second end of the connecting ring between the inner barrel and the outer barrel at a second end of the second pipe section, the second end of the connecting ring forming second butt-lap joints with the inner barrel of the second pipe section and the outer barrel of the second pipe section at the second end of the second pipe section; and
friction stir welding the second end of the connecting ring circumferentially to the second end of the second pipe section at the second butt-lap joints.

* * * * *